United States Patent [19]

Hicks

[11] Patent Number: 4,862,200
[45] Date of Patent: Aug. 29, 1989

[54] AUTOMATED PHOTOGRAPHIC APPARATUS

[76] Inventor: Ray Hicks, 2605 Corunna Rd., Flint, Mich. 48503-3362

[21] Appl. No.: 172,805

[22] Filed: Mar. 28, 1988

Related U.S. Application Data

[63] Continuation-in-part of Ser. No. 914,000, Oct. 1, 1986, abandoned.

[51] Int. Cl.⁴ .................. G03B 29/00; G03B 17/38; G03B 27/52; H04N 7/18
[52] U.S. Cl. ................................. 354/75; 354/105; 354/266; 355/29; 355/40; 358/102
[58] Field of Search ........... 354/75, 76, 105, 106, 354/109, 202, 266, 289.1; 355/28, 29, 40; 358/906, 93, 102, 903

[56] References Cited

U.S. PATENT DOCUMENTS

| | | | |
|---|---|---|---|
| 3,490,844 | 1/1970 | Sapp, Jr. ..................... | 354/105 X |
| 3,987,467 | 10/1976 | Cowles ........................ | 354/105 |
| 4,217,046 | 8/1980 | Weinstein et al. ............ | 354/106 X |
| 4,330,186 | 5/1982 | Hattori ....................... | 354/106 |
| 4,340,286 | 7/1982 | Carr ........................... | 354/105 |
| 4,489,351 | 12/1984 | d'Arc .......................... | 358/906 X |
| 4,500,183 | 2/1985 | Tanikowa ..................... | 354/21 |
| 4,574,692 | 3/1986 | Wahli ......................... | 354/105 X |
| 4,641,019 | 2/1987 | Iratsuki ....................... | 355/29 X |
| 4,694,354 | 9/1987 | Tanaka et al. ............... | 358/102 X |
| 4,728,978 | 3/1988 | Inoue et al. ................. | 354/289.1 |
| 4,771,343 | 9/1988 | Takenaka .................... | 354/102 X |

Primary Examiner—W. B. Perkey
Attorney, Agent, or Firm—Krass & Young

[57] ABSTRACT

An apparatus and method for correlating development instructions with individual photographic exposures as disclosed. Also disclosed is an integrated method of viewing, editing, printing and cutting individual photographic exposures based on previously stored data. The apparatus and method includes a device for the manual entry of information regarding the ultimate development and exposure of a photographic image, a memory device for storing the information, a shutter operating circuit for operating a camera shutter during the information storage phase. Thereafter, the information stored during the photographic phase may be transferred to the commercial photographic studio where the data can be used for a variety of processes, including commercial printing, editing, sorting, accounting, reporting, correlating and physical storage. The stored information produced at the time the photographic exposure is made is used to control all of the foregoing steps in a variety of combinations.

21 Claims, 3 Drawing Sheets

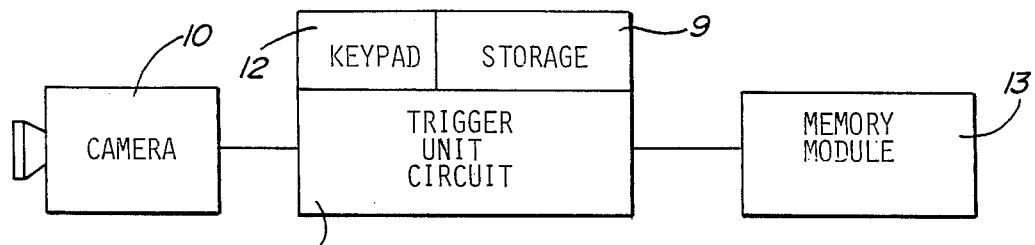
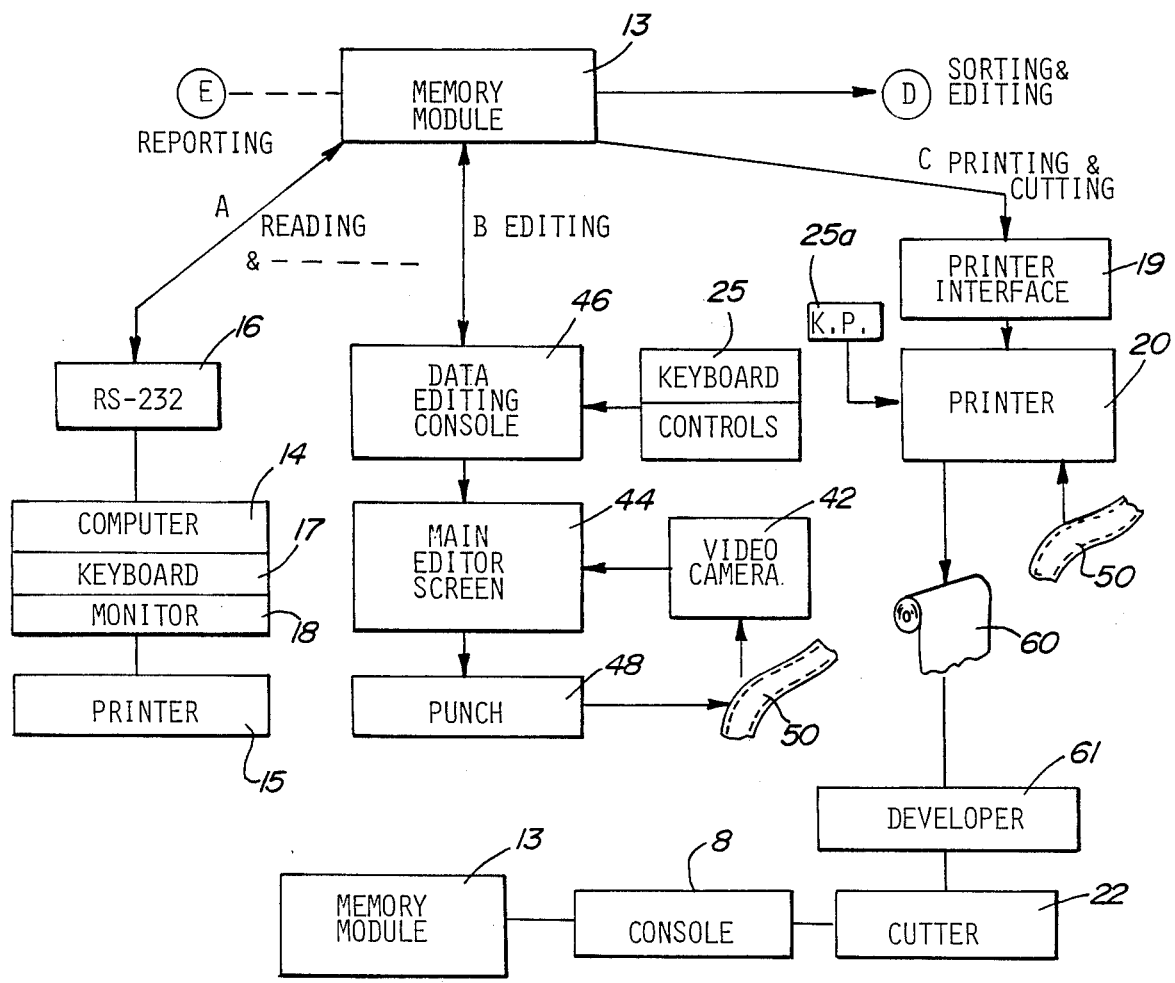
Fig-1A
Fig-1B

AUTOMATED PHOTOGRAPHIC APPARATUS

RELATED APPLICATIONS

This is a continuation-in-part of application Ser. No. 06/914,000, filed 10-1-86, now abandoned.

FIELD OF THE INVENTION

This invention is an apparatus and process intended to be used with commercial photography and photo processing systems and equipment.

DESCRIPTION OF THE PRIOR ART

After the development and perfection of the commercial photographic processes, these processes have become a thriving business, and a great deal of effort and attention are directed toward mass commercial photographic endeavors, such as the individual photographs of an entire grammar school or high school population on an annual basis, colloquially referred to as "school pictures", the photographing of all of the members of a large organization, an athletic team, for example, or the employees of a large corporation.

This commercial photography task is subject to substantial error, largely as a result of mistakes made by the human operators in the process chain. Typically, the individual thinks of placing a single roll of film of perhaps 12 to 36 exposures in an individual camera, and taking one or two dozen photographs of various objects or persons, usually well known to the photographer. This film is then presented to a commercial processing outlet for developing and printing, or, not infrequently, the photographic enthusiast is equipped with his own developing facilities at home. The finished prints are then viewed by the photographer. Typically, the prints are all of the same size, and individuals tend to be forgiving of the composition and color deficiencies of their own home photography.

The commercial application of the photographic process is on the extreme opposite of the spectrum. Being a competitive business, there is very little margin for additional overhead costs, and time is of the essence. In addition, a single photographer may photograph several hundred subjects as part of a single project. Moreover, each individual subject generally expects to be offered a variety of choices for his final purchase. For example, using the typical grammar school pictures as an example, the parent of the student being photographed may be offered the opportunity to purchase a single 8"×10" copy of the photograph, a combination of one 8"×10" and two 5"×7" photographs, or perhaps a collection of one large photograph and several wallet sized photographs. The necessity of offering to the customer a choice creates significant problems of matching a particular subject with that subject's actual photographic order at the time the photographic negatives are turned into prints.

A second significant problem with the commercial process is the control of the overall quality of the colors and hues. Typically, a commercial photographer will take into consideration, in the photographic process, the color of the background against which the subject is photographed, the tone of the subject's skin, as well as the color of the subject's eyes, hair and clothing. Information regarding this combination of color factors is helpful to the commercial processing of the commercial photograph, to obtain a true and accurate reproduction of the subject's appearance. Generally, because of the low cost and high volume maintained in large group pictures, the color balance factors are often somewhat disregarded. It simply is not cost effective to do otherwise.

Typically, once the photographer has exposed his film, there may be several hundred individual frames of subjects on a single roll. This may include duplicates of a single subject, where the photographer is not satisfied with the first or second exposures, for example, where the subject may have closed his eyes at the moment the photographs is taken, or where the photographer, after the photograph, notices a potential distracting feature about the subject's clothing, or the background. In the typical process, the film is developed in an entire roll, and placed in a commercial production printing machine. In this printing machine, the film's images are projected for an operator onto a screen, where the operator manually correlates written information about the subject and his or her order with the exposed frames. The operator selects the appropriate exposure for the subject, confirms the type of order which the subject has placed for prints, and enters the order information into a console. At the same time, the operator may or may not make color corrections. Once the decisions regarding the order and color balance have been made by the operator, the commercial printing machine automatically exposes the photographic paper from the film, in the number and sequence of photographs called for in the order. Again, this process is done on a large scale basis, with a continuous roll of photographic paper being developed and containing hundreds of images to be developed.

The exposed photographic paper is then presented for darkroom processing in an automated fashion.

As a final step, the orders are separated by a cutter, again based on a manual correlation of the order information with a visual examination of the print.

Although the above process operates satisfactorily, it is fraught with potential for error. Typically, the major problem is mistake in the coordination of the order placed by the customer, with the actual customer. Customer A, for example, orders a single 8"×10" glossy, and receives two 5"×7"s instead, while customer B receives customer A's order. It is apparent that the operator cannot, by recognition, connect up the names on a written order sheet with the photograph of an unknown subject.

To avoid this difficulty, commercial photography concerns have generally followed one of two basic methods. In method number 1, a card is prepared for each subject, and photographed along with the subject. The card contains identifying and order information. In order for this method to work properly, the information must be written clearly on the identifying card, and in extremely high contrast ink. The actual negative from which the negative photograph is developed is quite small, and the characters in the negative image would appear only one-eighth of an inch high on a very low contrast background. Also, if the card is mis-positioned, some of the data on it may be unreadable. In an alternate method, an identifier unit is placed in the camera, which contains automated visual images which are projected onto the film, as an improvement over the manually held card. However, if the identifier mechanism fails to fire, the order for the subject will be lost. In the event of a failure of the film advance or double exposure, the data may be unreadable or superimposed on another photograph. The photographer must remember when to change the identification card and order code for each subject.

In a second method to avoid the problem, a single identifying slate is photographed identifying the "batch" of subjects being photographed. The photographer then keeps a list of the frames and orders, in a particular order, starting from the first identifying slate.

This method does not permit any interruption of the order in which the photographs are taken, and no changes whatsoever may be made. In school settings, in particular, this can be a very trying situation where students may be absent, change places in line and so forth. Any interruption in the sequence of the customers, causes a complete interruption in the sequence of all subsequent orders. Also, a failure to properly expose the slate frame is disastrous. Efforts have been made to encode information on film, and to transfer that data to the commercial processing environment, but with only limited success. For example, U.S. Pat. No. 3,490,844, issued to H. B. Sapp discloses a method of encoding on the film and indicium designating a select portion of a film negative from which a print is desired. However, this indicium contains no exposure information, nor is there any method for modifying the data encoded on the film after its exposure.

U.S. Pat. No. 4,340,286, issued to David L. Carr discloses a photographic film containing a magnetic recording hub. Again, no method for externally reading or modifying the data is disclosed, likewise, the magnetic recording medium is not reusable, nor is there any method disclosed for editing the information in regard to viewing of the developed negative and print.

U.S. Pat. No. 4,217,046 contains no removable media, but requires an interface directed to the camera. Likewise, the only output of information from Weinstein is to a printed paper tape.

U.S. Pat. No. 4,574,692 issued to Wahli includes no means for modification of the film data.

To avoid these problems, and establish a positive method of identifying each subject and each subject's order, the invention described herein establishes a vastly improved system for identifying the customer and his order, as well as allowing for color correction.

SUMMARY OF THE INVENTION

It is an object of this invention to provide a new apparatus and method of correlating and processing photographic orders in a photographic setting.

Another object of this invention is to provide an automated method of entry of order information and transferring said information to the automated printing process.

It is a further object of this invention to allow the creation of a separate, non-volatile record of photographic information in relation to the physical negative.

A further object of this invention is to provide a method of correlating the completed exposed and developed photographic film with a particular photographic order and instructions regarding said order.

A further object of this invention is to provide a method of correlating the developed photographic film with a specific photographic order in relation to the process for exposing the photographic film for purposes of color correction, error correction, cutting, and sorting of orders.

BRIEF DESCRIPTION OF THE DIAGRAMS AND DRAWINGS

A better understanding of the present invention will be had in relation to the following detailed description when read in conjunction with the accompanying diagrams.

FIG. 1 is a block diagram outlining the major components of the process, and showing the various date of paths;

FIG. 1a is a block diagram outlining the major components of the photographic system described herein, at the point of photographing the subject;

FIG. 1b is a block diagram outlining the major components of the process, ensuring the various paths for data;

DETAILED DESCRIPTION OF THE PREFERRED EMBODIMENT

Figure 2:
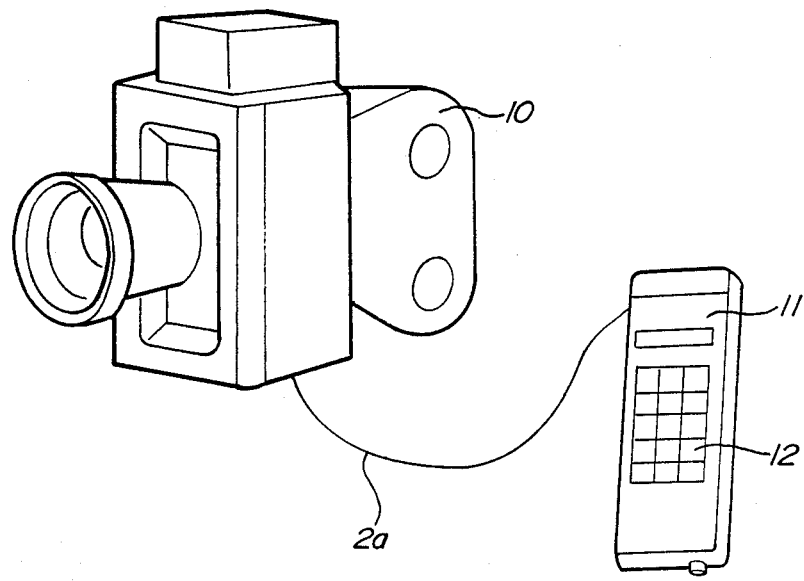
FIG. 2 is a perspective view of the trigger unit key pad connected to the photographic camera unit.

Referring now to FIG. 1A, a photographic camera 10 is removably connected to a combined trigger unit 11 and key pad 12, which also contains a micro-controller comprising a temporary storage register 9, which accepts order, color balance and photo finishing information through entry of data into the key pad. When the trigger of the trigger unit is activated, the camera shutter opens and the film is exposed, and simultaneously, the data input into the trigger unit, which is visible in a display in the trigger, is stored first in the volatile storage register within the trigger unit, and then transferred to a self-contained, removable, non-volatile erasable programmable read only memory module 13. Said memory module 13 is equipped with sufficient memory to store exposure, order and photo finishing information for several hundred individual frames. Although the memory module, in the preferred embodiment, is in the form of an erasable, reusable, programmable read on memory device of a type commercially available, it is also possible to utilize erasable electronic media such as magnetic disks, magnetic tapes, bubble memory, a physically altered cardboard card, such as a Hollerith card, or any of a variety of other storage means.

Upon completion of the photographic project, the memory module 13 is removed from the trigger unit and supplied, along with the exposed film to the developing studio. Referring now to FIG. 1B, the memory module, so exposed, may be processed by the commercial developer along five discreet paths, A through E. Typically, the initial path A is the electrical connection of the memory module to an RS232 interface 16, which is in turn connected to a computer 14, equipped with a conventional keyboard 17 and monitor 18. The data regarding each exposure is viewable, on an exposure by exposure basis on the monitor 18. The information is also transferable in hard copy form to a computer printer 15. Further, at this stage, the data regarding each exposure is subject to modification, and new information in regard to each exposure may be overwritten into the memory module 13. Further, reports regarding the contents of each memory module may be generated through suitable software and printed on the printer 15.

Referring to editing data path B, the memory module 13 may be connected electrically to a data editing console 46, which is also equipped with a keyboard 25.

Information from the memory module and key pad is transferable to a main editor screen 44, which is in the form of a video display screen. The exposed film 50 from the photographic job is mounted to a console adjacent to a video camera 42, and the video camera use each exposure on the film 50, and transfers the video image to the main editor screen. In this fashion, the data information from each exposure contained within the memory module may be displayed on the main editor screen 44 simultaneously with the negative image from the film 50. This allows the operator to view the image and the data simultaneously. Further, utilizing a punch 48, operated from the console 46 the operator can place punch marks on the edge of the film 50 near each negative, to identify each film negative exposure by its appropriate identifying number, correlating to the information contained in the memory module 13.

Data path C for the memory module is summarized as follows: the memory module 13 is electrically connected to the printer interface 19, wherein the exposure information is used to automatically operate the commercial printer 20. A manual key pad 25 may also be utilized to input starting and correction information into the automated printer. The automated printer, utilizing the exposed film 50 and data from the memory module 13 creates a continuous roll of exposed photographic paper 60. The exposed photographic paper 60 is physically transferred to an automated paper developing station 61. The developed paper is then presented to a cutter unit 22. Utilizing memory module 13, data regarding the order may be transferred to a cutting console 8 to allow correlation of the photo finishing data with the exposed paper, and to allow automated operation of the cutter.

In data path D, the memory module is transferred to a data editing interface 60 mounted on a sorting console 64. The exposed film 50 is likewise mounted on the sorting console 64, the sorting console 64 is equipped with a video display screen 66, which allows viewing of the film negatives with the naked eye, in the same manner as the main editor screen 44 allows preliminary viewing of the negatives and the data editing information. Again, a key pad 62 may be used to edit the contents of the memory module 13. A printer 68 may be utilized to generate editing reports at this stage of the process.

Finally, data path E allows the memory module to again be transferred to an RS232 interface 16 and computer 14 for quality control and reporting purposes.

Having described the general operation of the system, the detailed operation of each aspect is set forth further as follows:

Camera and Trigger Unit

With reference to the diagram FIG. 2, a typical commercial camera 10 is shown, which cameras are typically equipped with an electronically operable shutter mechanism. The trigger unit 11, in addition to its other functions, provides a 15 to 50 millisecond positive going pulse generated by an optoisolated circuit for shutter operation.

Figure 3:
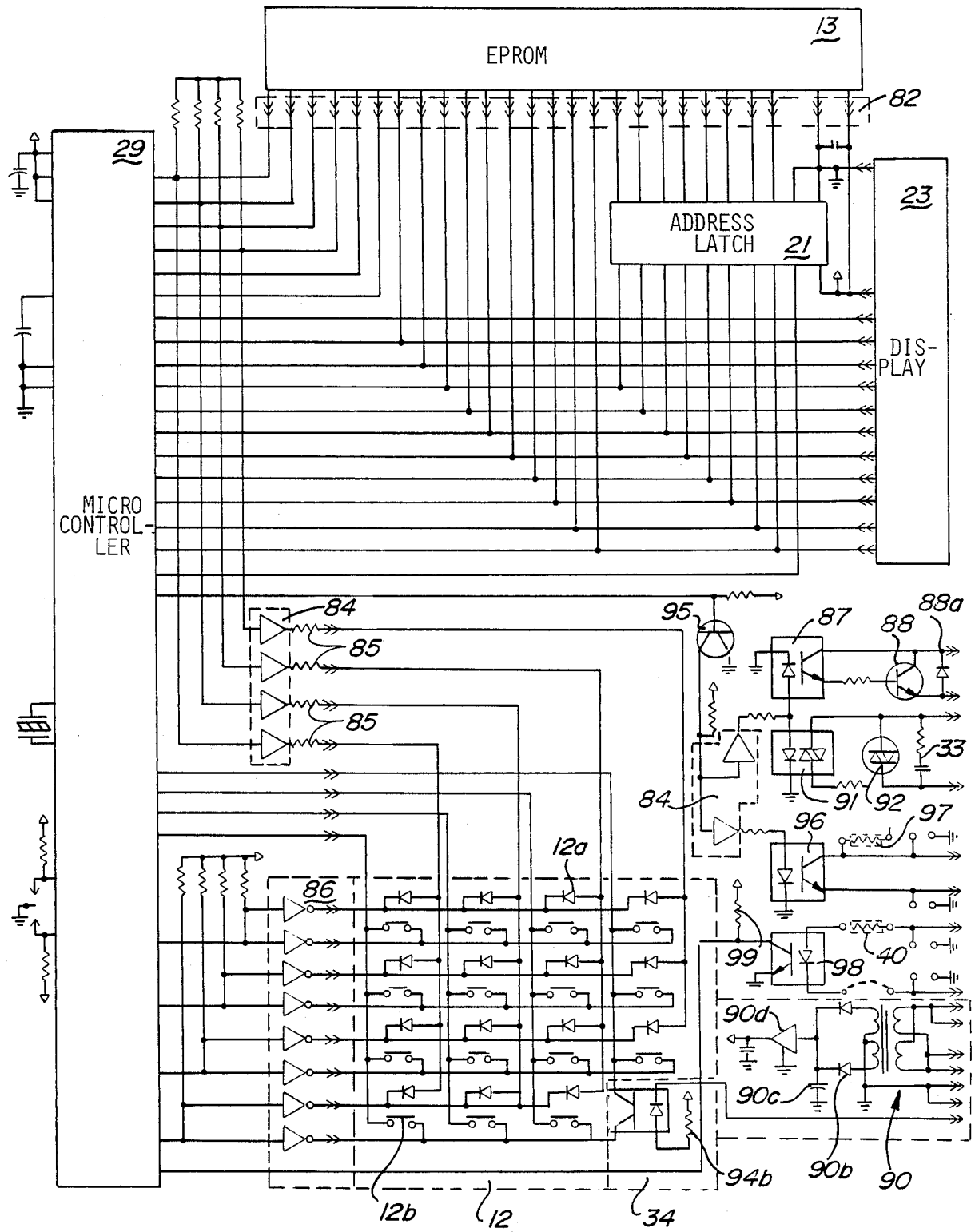
FIG. 3 is a schematic diagram of the trigger unit, reader unit, key pad and associated EPROM module.

Referring now to FIG. 3, the first step in the operation of the unit consists of resetting the erasable programmable read only memory 13 (EPROM). The EPROM module 13 contains several thousand eight-bit bytes of erasable memory, which, prior to the photographic setting, is cleared by entering the appropriate clear memory code sequence into the key pad 12. In an alternate embodiment, where magnetic media are used, the initial step consists of erasing or clearing the magnetic disk, tape or other magnetic media in preparation for writing of data. The resident system software in read only memory in the micro controller 29 then "locks out" the further operation of the unit until such time as the EPROM has been completely erased. The keyboard next accepts entry of a package selection code, beginning with a coded command to advise the shooting unit to enter the shooting mode.

Following this advisory instruction to the micro-controller 29, the micro-controller 29 is next provided by key pad entry a single four byte instruction to establish the operating parameters for the photographic session. The micro-controller 29 then accepts additional instructions as to the number of pacer frames, the size of each pacer frame, and the size of the initial or slate frame. The micro-controller then accepts key pad instructions for the number of package selections to be contained within the order. A package selection is a mixture of various photo sizes of a particular subject to be offered, for example, one 8"×10" photograph, two 3"×5"'s and 16 wallet size.

Next, the micro-controller 29 of the trigger unit accepts from the operator, through the key pad a job code number, a control code number and an instruction indicating that the operating parameters for the job have been completed.

The package selections are separately programmable. The micro-controller first accepts a package number, followed by a size code. The size code is a numeric code, to which is assigned a size number. For example, an 8"×10" photograph may be coded as a size code 1. A 5"×7" photograph may be coded as a size code 2, and a wallet size photograph may be coded as a size code 3. By inserting into the shooter unit key pad, for example, "PK 01 SIZE 1-02", the micro-controller programs the erasable programmable read only memory to comprehend that in package 1, two size 1 photos (8"×10") will be included. The operator then enters, for example, "PK 01 SIZE 2-04", of the subsequent component of four size 5"×7" photographs.

By this method, the photographs in a particular package are defined. Thereafter, the operator, by depressing the code buttons for package 01 for any particular subject, will ensure that the subject receives, at the time the order is processes, two 8"×10" photograph and four 5"×7" photographs. Up to 99 packages are programmable in the preferred embodiment of the invention.

Additional data regarding the details of the subject's order, including color and exposure information, may be input prior to the exposure of the film into the trigger units via the key pad 12 on the unit, which is confirmed with a liquid crystal type display 23 also located on the key pad. The electronic shutter of the camera is operated via the trigger unit to expose the film and simultaneously, the data regarding the particular order is transferred to the memory module. All circuitry, except the key pad and EPROM is mounted on a printed circuit board.

The preferred memory module consists of an erasable programmable read only memory (EPROM) 13, to which data is transferred by a 8749 micro-controller integrated circuit 29 contained within the trigger unit and an associated address latch 21, to hold the low order address bits. Typically, only eight address lines and eight bits of binary data are necessary for the typical commercial photographic task. However, it should be noted that the process herein disclosed is readily adaptable to a more extensive address bus as well as bytes of data larger than eight bits. In the current embodiment of the invention, the lower four bits of port number 2 of 8749 micro-controller 29 are used to supply a 12 bit address field.

Each exposure of the film increments the address of the programmable read only memory 13, resulting in an allocation of multiple eight bit bytes of data for each exposure. This data provides information as to which of the photographic package selections the subject has chosen, as well as identifying information regarding the subject and data concerning the exposure correction factors.

The EPROM module is connected to the trigger unit by a edge card type connector 82, providing the necessary number of printed circuit board connections to interface with the trigger unit. The EPROM module 13, itself, consists of a small printed circuit card on which two 2816A 2K×8 EPROM chips are mounted in conventional fashion.

The trigger unit consists of a 16 key key pad 12, up to 16 discrete light emitting diode (L.E.D.) indicator lamps 12a, and a multiple-character liquid crystal display 23. The display and lamps are set up as a multiplexed 8×5 array wherein the eight anode lines are driven by a UDN2982 sourcing driver 84, and the output lines of the UDN2982 are connected to the anode lines of the displays and lamps via an 8×220 ohm resistor array 85, in series with each anode line, serving as a current limiter for the segments of the displays and lamps.

The input to the UDN2982 driver is connected to the several input lines of port 2 of the 8749 micro-controller. The five cathode lines of the display array are connected to the outputs of an ULN2803 sinking driver 86. The inputs of the ULN2803 are connected to port one of the 8749 micro-controller 29, and in addition to the 8th bit of port two of the micro-controller via the 8th ULN 2803 buffer line. The outputs of the ULN2983 24 are used to operate the camera exposure cycle. Inasmuch as some commercial cameras operate on AC current and others on DC current, the trigger circuit is universal. It consists of a 4N25 optoisolator 87, the anode of which is driven by the UDN2982 84, and the cathode by the ULN2803. The output of the optoisolator connects with a TIP 121 transistor 88 and diode 88a in combination, to clamp inductive spikes.

The TIP 121 28 is driven by output transistor 4N25 97 in a Darlington configuration.

AC drive is accomplished by using an MOC3011 optoisolated triac trigger 91. The input anode of the MOC3011 is driven by the UDN2982 in the cathode by the ULN2803. The MOC3011 output stage then drives a TAG 200-204 triac 92.

The output of the MOC3011 is tied in parallel with the main terminal and the gate terminal of the triac and an RC snubber 93 is connected across the main terminals of the triac gate.

The 16 key pad 12 on the trigger unit is a 4×4 cross point array, the output of which is multiplexed to four bits of port 2 and four bits of port 1 of the 8749 microcontroller. The key pad keys are normally open, single pole single throw switches 12b, containing integral L.E.D. status lamps. The keyboard matrix is software driven by a micro-operating system in read only memory within the controller itself.

Multi-pin connectors provide electrical and mechanical connections for the key pad that is more particularly comprised of 15 normally open single pole single throw momentary switches, each with a key cap containing an L.E.D. status lamp for each key. These L.E.D. status lamps are also organized as a 4×4 matrix, and the switches and light emitting diodes are physically arranged as five rows of three keys in column. The 16th key is used as an external input key, as a trigger button for the photographer. Each row of key switches is driven low by ULN2803 sinking driver 86, which is connected to a single bit of port 2 of the micro-controller. The open or closed state of each switch is sensed on the column line of switch matrix by a bit from port 1 corresponding to the column. The cathode of each L.E.D. associated with each switch is also brought low by the same ULN2803 sinking driver connected to a bit of port 2, the anode is driven by a UDN2982 84 sourcing driver connected to a bit of port 2. This matrix connection allows for a matrix scan reading of the switches and multiplex operating of the L.E.D.'s contained within each key cap.

The 16th key, above described, is inputted to the matrix via a 4N25 optical isolator 94, the output transistor of which is tied to the sinking driver for the 4th row, and the collector of which is tied to the scan line for the 4th column. The input to the 4N25 isolator for the key has its cathode tied to one pin of the multi-pin wiring harness connector, and the anode is tied to a five volt source via a 330 ohm resistor 94b. Accordingly, the operation of the 16th key is a simple shorting to ground, thereby activating the optoisolator.

When AC output is required, the AC output is controlled by a port bit of the micro-controller. This port bit controls an MPS6513 transistor 95, which is connected by common emitter to make a signal inverter. The inverted signal is shared between the AC and DC outputs. The signal is used to drive a sourcing driver, which is a portion of the UDN2982 package 94. The output of the driver is connected to the input anode of an MOC8011 optically isolated triac trigger 91. The input cathode of the triac trigger is tied to ground, the output of the triac trigger is connected, in parallel, with the main terminal and the gate of a TAG 200-204 triac 92. A resistance-capacitance snubber 93 consisting of a 100 ohm resistor in series with a 0.01 microfarad capacitor, is connected, in parallel with the main terminals 1 and 2 of the triac, to limit the voltage on the device, to prevent false triggering and to suppress radio frequency interference. Terminals 1 and 2 of the triac are routed to a multi-pin connector which connects the wiring harness to the main printed circuit card.

DC output uses the same signal line and inverter as the AC output. The output of the inverter is connected to a sourcing driver, which is a portion of the UDN2982 package 84. The output of the sourcing driver is connected to a 4N25 optically isolated transistor package 87, and drives the anode of the input L.E.D. via a current limiting resistor. The cathode of the L.E.D. is connected to ground. The output transistor of the optically isolated transistor package is connected in Darlington configuration to a TIP 31A power transistor 88. A free-wheeling diode 1N4004 88a is connected between the collector and emitter of TIP31A, to protect the transistor from inductive spikes. The emitter and collector pins are routed to the multi-connector of the main wiring harness.

Output for serial communications, such as an RS232 interface, is provided by the same port line that is used to operate the AC and DC outputs. This line, using the same inverter, drives a sourcing driver 84 that in turn drives the anode of the input L.E.D. of a 4N25 optical isolator (36) via a 220 ohm resistor. The cathode of the input L.E.D. is connected to ground. The output transistor is set up as a noncommitted emitter and collector. Provisions are made on the main card to tie the collector to a +5 volt source via a current limiting resistor 97, or to ground to enable it to handle negative voltage in a common collector configuration. The emitter has provision for a connection to negative voltage source through a current limiting resistor or to ground. The emitter and collector are routed to a multi-pin harness connector.

Input for serial communication or other external signals is likewise via a 4N25 optical isolator 88. The collector of the output side is pulled high by a 4.7K ohm resistor 89, and the emitter is tied to ground. The signal, available at the junction between the pullup resistor, is routed to the interrupt pin of the micro-controller 29 for use by the program contained on the micro-controller. The input anode of the 4N25 is routed to a pin of the wiring harness connector, and provisions are made for a current limiting resistor 40, blocking diode, or grounding of the signal to the anode. The cathode of the 4N25 input L.E.D. is also routed to the 15 pin wiring harness connector, and provisions for grounding the input signal are also made.

Power is supplied to the trigger unit by a low profile transformer 90 that is mounted on the main printed circuit board. The transformer is connected to two 1N4004 diodes 90b that form a center tap rectifier. The full wave DC current is smoothed by an electrolytic capacitor 90c. Regulation of the DC voltage is accomplished by a 7805 three terminal regulator 90d. The output of the regulator is a positive 5 volts, and is used as the positive supply voltage for the entire control circuit. The transformer is also used to generate a negative 8 volt supply. The negative voltage so created is used for serial communication.

The primary of the power transformer is connected, through the wiring harness connector, to 120 volts AC.

The trigger unit may also be powered from a self-contained or external DC voltage supply. However, when a DC voltage supply is used, the negative voltage required for serial communications is generated by an ICL 7660 charge pump mounted on the main circuit card. The trigger unit is polarity clamped to protect the unit from polarity reversal, and regulation of external current sources is accomplished via a 7805 voltage regulator and tantalum capacitors.

The trigger unit 11 is housed in a blank case with appropriate apertures for the keyboard and display, as shown in FIG. 2. One end of the box allows for connection between the trigger unit and the EPROM module, which is likewise enclosed.

The circuit boards in both the trigger unit and EPROM module case are held in place by captive fasteners pressed into the boxes and screws. A connecting cable 2a, with a quick disconnect, allows for easy connection to the camera unit.

The trigger unit also is equipped with a liquid crystal display readout 23, arranged as a 16 character, 5×7 dot matrix alphanumeric device which is connected to the shooter unit main printed circuit board by a multi-pin connector. The liquid crystal display device itself operates from a five volt positive signal, and is equipped with ground signals as well as an 8 bit data bus, a device select, and read and write inputs to operate the display module under program control. Data to and from the EPROM and the display are derived from the bus port of the micro-controller.

Photograph Processing

Once the memory module has received stored data in its EPROM's, it can be removed from the trigger unit and stored, or physically transferred to the developing studio. At the same time, the exposed film is presented to the photographic studio for initial processing, specifically, developing of the film to create a conventional continuous roll of photographic negatives.

The photographic processing sequence once written to, the memory module 13 serves as the source for a variety of functions in the commercial photo finishing process. The first of these processes, defined by data path A in FIG. 1B is the reading and first editing process. The memory module 13 is electrically connected via an RS232 interface to a computer 14, equipped with a standard keyboard and monitor. Through suitable computer software, a series of instructions are communicated to the RS232 interface and memory module, to allow the reading of the data from the memory module and display of that information on the computer's video screen, or to the printer 15. At this stage, preliminary reports may be prepared regarding the data, labels may be printed, and the data may be displayed and edited on the computer video screen. This edited data is rewritten, as needed, to the memory module 13.

Path B carries the information from the memory modules 13 to the second editing process, film editing. In this step, in the the process, the individual exposures on the film, in negative form, are viewed simultaneously with the data contained on the memory module. The roll of developed film 50 is spool mounted in a suitable position on the data editing console 46. The memory module 13 is electrically connected to the data editing console at the same time. A compact video camera 42 is likewise integrally mounted to the data editing console, and positioned with suitable lenses, mirrors and light sources to view the image on the film roll 50. The video signal generated by the video camera is passed to the main editor screen, which is a video display screen electrically connected to the data editing console as well as the video camera. In this manner, the photographic negative image for each exposure is displayed, in sequence, on the main editor screen 44. A key pad and set of key controls 25 serves to direct the electrical functions of the data editing console 46 as well as the movement of the roll of film between the spools on which it is mounted. In this fashion, the operator may selectively place a single photographic negative exposure from the roll of film 50 on the main editor screen 44 by utilizing the key pad and controls 25. Simultaneously, the information contained in the memory module can be displayed on the main editor screen 44, by virtue of software contained within the data editing console and an appropriate interface. Again, use of the key pad and controls 25 allows selection of particular items of data, as well as editing of particular items of data within the memory module. In the preferred embodiment, accordingly, the operator is presented with a view of the each photographic negative, under operator control, and at the same time, is able to view, in readable form, all data contained within the memory module concerning that negative. If necessary, the data contained within the memory module can be edited. For example, if the data for a particular exposure in the memory module 13 indicates an improper degree of color correction, new color correction information can be input through key pad and controls 25 through the data editing console, and written to the memory module 13. At the same time that the operator views and edits information, the film may be punched with a discreet code at the edge of the negative, by means of a film punch 48 which is likewise mounted to the data editing console. In this fashion, a discreet numerical code for each negative is imprinted in the film at this step.

With reference now to path C, the use of the memory module for the printing and cutting processes can be seen. Utilizing an appropriate electronic printer interface 19, the data from the memory module is transferred to an automatic photographic printer 20. Specific instructions for starting and stopping the operation of the printer may be entered by virtue of a key pad 25a, which directly interfaces to the microprocessor contained within the printer 20. The roll of film 50 is appropriately attached to the film spools of the photographic printer 20, and commencement of operation instructions are given to the photographic printer by virtue of key pad 25b. The photographic printer then automatically exposes each negative on the roll 50, accordingly to stored instructions contained in memory module 13. At the completion of the process, the photographic printer has generated a continuous roll of exposed photographic paper 60. This continuous roll is physically transported to a commercial photographic developer unit 61, which automatically develops the exposed photographic paper, producing a continuous roll of finished photographic prints. In the preferred embodiment, the exposed roll of prints is physically mounted to an automated print cutter 22, which is operated by instructions contained within a dedicated micro-controller in printer console 8. Again, memory module 13 is used as the source of print job instructions to the automated cutter, ensuring that the disposed paper is cut at appropriate locations to ensure proper separation of the photographic order.

With reference now to path D in the method, the completed photographs from the output of the paper cutter 22 is manually collated, and is presented to a sorting and re-editing operator. The sorting and re-editing operator operates a sorting console 64, which is essentially identical to the data editing console 46 in its operation. The memory module 13 is electronically connected to a data editing interface 60 mounted and electrically connected to the sorting console. The sorting console is likewise equipped with a video display screen 66, and a key pad 62 for data entry. In addition, a printer 15 may be included in this station. At the sorting and re-editing step, the operator views the finished prints and at the same time is able to view the negatives from the roll of film which are transported on spools in the sorting console 64. Again, the operator is afforded the opportunity to view the exposed and printed photographs at the same time that the operator views the photographic negative and the data stored in memory module 13 regarding each exposure. This step permits the operator to enter instructions to reprint particular film negatives, and to store the reprinted instructions in memory module 13. It also permits modification of exposure information in regard to any reprint order. In the preferred embodiment, accordingly, a certain number of exposures from the film 50 will be marked on the memory module 13 as requiring reprinting. At this stage, the memory module and film can again be presented to the printer interface 19 and printer 20 for reprinting. However, because the automated printer is programmed not to print any exposure which has previously been printed, the automated printer will operate to reprint only those film negatives which have been marked by the sorting and re-editing operator as negatives to reprint.

The process defined by data path E is essentially identical to that defined by data path A. However, it differs in that, at this point in the photo finishing process, the memory module 13 has been edited, and each exposure defined by instructions in the memory module has been printed. In addition, the data contained in the memory module for each exposure may have been modified, for example, there may have been one or more instructions to reprint a particular film negative. Because the information regarding the number of modifications to the memory module is valuable production information, it is often desirable to reread the memory module after the photo finishing process is completed, to determine whether or not a particular source of commercial photographic work has a particularly high or particularly low percentage of reprinted photographs. This enables quality control information to be transmitted to the photographer, so that he may know of an extraordinary number of difficulties with his photographic session. Using this information, the photographer may be able to make necessary changes to his techniques or equipment to ensure a lower reprint rate. Likewise, at this stage, final packaging, labeling and reporting information may be generated from the memory module.

Having thus described my invention fully and in detail, it may be seen that numerous obvious improvements to said invention may be made, without varying substantially from the invention claimed herein.

What is claimed:

1. A method of storing, retrieving and utilizing data regarding the development of one or more photographic exposures of one or more photographic subjects, comprising:
   (A) entry of said data in a temporary storage register;
   (B) simultaneously (1) transferring said data from said temporary storage register to self-contained, removable non-volatile storage media and (2) operating the shutter of a photographic camera, exposing photographic film contained therein;
   (C) retaining said data in said non-volatile storage media for an indefinite period of time;
   (D) developing said film;
   (E) transferring said developed film to an automated photographic printer; and
   (F) utilizing said data to operate said automated printer, thereby exposing a section of photographic paper.

2. The method of claim 1 which further comprises the additional steps of:
   (A) developing said photographic paper;
   (B) transferring said paper to an automated paper cutting device; and
   (C) utilizing said data to operate said automated paper cutting device.

3. The method of claim 1, wherein said temporary storage register comprises a micro-controller.

4. The method of claim 1, wherein said nonvolatile storage media further comprises erasable programmable read only memory.

5. The method of claim 1, wherein said non-volatile storage media further comprises magnetic storage media.

6. The method of claim 1, wherein said simultaneous transfer and operation further comprises:
   (A) latching a storage address by means of an address latch;
   (B) sending an electronic signal in the form of a short duration AC voltage to said camera shutter; and
   (C) simultaneously with the sending of said electronic signal, writing said data at said storage address in an erasable non-volatile storage device.

7. The method of claim 1, wherein said data entry further comprises manual depression of keys on an electronically readable key pad matrix.

8. The method of claim 1, wherein said utilization of said data to operate said automatic printer further comprises:
   (A) converting said data to RS232 compatible format;
   (B) electrically transferring said data to the operating console of said automated printer by means of an RS232 compatible interface;
   (C) converting said RS232 compatible data to instructions for the operation of said automated printer; and
   (D) operating said automated printer based on said instructions.

9. The method of claim 2, wherein said utilization of said data further comprises:
   (A) converting said data to RS232 compatible format;
   (B) electrically transferring said data to the operating console of an automated paper cutting device;
   (C) converting said RS232 compatible data to instructions for the operation of said automated paper cutting device; and
   (D) operating said automated paper cutting device based on said instructions.

10. A method of storing and retrieving data regarding the parameters of exposure development of one or more photographic exposures of one or more photographic subjects comprising:
    (A) entry of said data in a temporary storage register;
    (B) simultaneously (1) transferring said data from said temporary storage register to self-contained, removable, non-volatile storage media and (2) operating the shutter of a photographic camera, exposing photographic film contained therein;
    (C) retaining said data in said non-volatile storage media for an indefinite period of time;
    (D) converting said data to RS232 compatible format; and
    (E) transferring said data in said RS232 compatible format to a visually readable medium.

11. The method of claim 10, wherein said visually readable medium is a line printer.

12. The method of claim 10, wherein said visually readable medium is a peripheral display device.

13. The method of claim 12, wherein said peripheral display device is a liquid crystal display.

14. An apparatus for storing, retrieving and utilizing data regarding the development of one or more photographic exposures of one or more photographic subjects comprising:
    (A) a key pad for entry of said data;
    (B) a display;
    (C) a micro-controller electrically connected to said keypad and said display for the temporary storage of said data;
    (D) a read only memory contained within said micro-controller;
    (E) an RS 232 compatible interface connected to said micro-controller;
    (F) data transmitting means for transmitting said data to and from said micro-controller through said RS 232 interface;
    (G) a self-contained, removable, non-volatile memory electrically connected to said keyboard and display;
    (H) a circuit for simultaneously generating an electrical pulse connected to the shutter operating mechanism of photographic camera containing film and operating said data transmitting means to transfer said data from said micro-controller to said self-contained, removable, non-volatile memory; and
    (I) a power supply for supplying electrical current to said micro-controller, said memory, said keypad, said display and said circuit.

15. The apparatus of claim 14, which further comprises:
    (A) means for non-destructive removal of said non-volatile memory from said connections to said keyboard and said display;
    (B) a second RS232 compatible interface remotely located from said apparatus;
    (C) means for electrically connecting said non-volatile memory to said second RS232 interface;
    (D) means for transferring said data from said non-volatile memory to said RS232 interface; and
    (E) means for transferring said data from said RS232 interface to an automated photographic printer.

16. The apparatus of claim 15, which further comprises means for manual entry of additional data to said second RS232 interface.

17. The apparatus of claim 16, wherein said means for manual entry is a keyboard.

18. The invention of claim 15, which further comprises:
    (A) a third RS232 compatible interface, remotely located from said first and second interfaces;
    (B) means for electronically connecting said non-volatile memory to said third RS232 interface;
    (C) means for transferring said data from said non-volatile memory to said RS232 interface; and
    (D) means for transferring said data from said third interface to an automated paper cutting device.

19. A method of storing, retrieving and utilizing data regarding the development of one or more photographic exposures of one or more photographic subjects comprising:
    (A) entry of said data in a temporary storage register;
    (B) simultaneously (1) transferring said data from said temporary storage register to self-contained, removable, non-volatile storage media and (2) operating the shutter of a photographic camera, exposing photographic film contained therein;
    (C) retaining said data in said non-volatile storage media for an indefinite period of time;
    (D) developing said film;
    (E) transferring said developed film to a device for transporting said film before the lens of a video camera;
    (F) using said video camera to image said film, and transfer said image to a video display screen;

(G) simultaneously converting said data to format suitable for display on said video display screen;

(H) simultaneously displaying the image of said photographic negative and said data on said screen;

(I) selective modification of said data based on the appearance of said photographic negative image displayed on said screen;

(J) storing said modified data in said non-volatile storage media; and (K) imprinting on the each negative from said film a coded mark, correlating each exposure on said film to particular data stored in said non-volatile storage media.

20. The invention of claim 19, which further comprises:

(A) transferring said data to an automated photographic printer;

(B) transferring said film to said automated photographic printer;

(C) utilizing said data to operate said automated photographic printer to print pursuant to said data a photographic image from said film;

(D) creating a series of said exposures in a continuous roll;

(E) developing said exposed photographic paper; and (F) utilizing said data to separate individual photographs from said continuous roll.

21. The method of claim 20, which further comprises the additional steps of:

(A) creating a visual image of each said exposures;

(B) simultaneously viewing said data corresponding to each said exposure;

(C) simultaneously viewing the print produced from each said exposure;

(D) selectively editing said data based on said comparison; and (E) creating a printed report of said comparison.

* * * * *